May 15, 1951 DE VERE C. HOLLENBECK 2,553,256

MAGNETIC WIRE SOUND RECORDING AND REPRODUCING APPARATUS

Filed July 3, 1946 4 Sheets-Sheet 1

INVENTOR.
DeVere C. Hollenbeck.
BY
Harness, Dickey & Pierce.
ATTORNEYS.

INVENTOR.
DeVere C. Hollenbeck
BY
Harness, Dickey & Pierce
ATTORNEYS.

May 15, 1951 | DE VERE C. HOLLENBECK | 2,553,256

MAGNETIC WIRE SOUND RECORDING AND REPRODUCING APPARATUS

Filed July 3, 1946 | 4 Sheets-Sheet 3

INVENTOR.

De Vere C. Hollenbeck.

BY

Harness, Dickey & Pierce

ATTORNEYS.

May 15, 1951 DE VERE C. HOLLENBECK 2,553,256

MAGNETIC WIRE SOUND RECORDING AND REPRODUCING APPARATUS

Filed July 3, 1946 4 Sheets-Sheet 4

INVENTOR.
DeVere C. Hollenbeck
BY
Harness, Dickey & Pierce.
ATTORNEYS.

Patented May 15, 1951 2,553,256

UNITED STATES PATENT OFFICE 2,553,256

MAGNETIC WIRE SOUND RECORDING AND REPRODUCING APPARATUS

De Vere C. Hollenbeck, Ferndale, Mich., assignor, by mesne assignments, to Lapeer Manufacturing Company, Detroit, Mich., a corporation of Michigan Application July 3, 1946, Serial No. 681,177

10 Claims. (Cl. 242—54)

The present invention relates to magnetic wire sound recording and reproducing apparatus.

In apparatus for this purpose, it is customary to feed the wire from a wire spool to a take-up spool during recording or play-back and thereafter rewind the wire at high speed on the wire spool. For magazine-type machines or any machine which employs a small diameter take-up spool, it is necessary to feed the wire during recording and play-back by a motor driven means which engages the wire at a point between the rolls and to apply a slipping drive to the take-up spool in order to take up the slack in the wire. The preferred form of slipping drive includes an eddy current magnetic clutch which will transmit a torque proportional to the difference in speeds between the input and output clutch members. However, this arrangement has a tendency to throw a loop in the wire when the motor is started due to the fact that in prior constructions as soon as the motor starts to operate it starts feeding the wire. This feeding of the wire begins before the torque applied to the take-up spool builds up sufficiently to take up the slack. As a result, a loop is thrown in the wire and troublesome tangles or breakage often follow. In addition, similar loops are often thrown on termination of the recording or play-back operation due to overrunning of the wire feeding means or on termination of the rewind operation due to the tendency of the take-up spool to overrun.

Therefore, the primary objects of the present invention are to provide a magnetic wire sound recording and reproducing apparatus having novel and improved means for delaying the feeding of the wire to the take-up spool during play or recording until a tension is applied to the wire by the take-up spool and to provide means actuated on termination of the operation of winding the wire in either direction to prevent the formation of loops due to overrunning of the wire-feeding means or the take-up spool.

Another object of the present invention is to provide a wire-feeding means of the type which grips the wire at a point between the spools and which is rendered operative for feeding the wire in response to the application of tension to the wire by the take-up spool.

Further objects and advantages of the present invention will be apparent from the description which follows when considered in connection with the accompanying drawings, in which like numerals indicate like parts wherever shown and wherein:

Figure 2 is a sectional elevation taken on line 2—2 of Figure 1, with certain of the parts broken away;

The apparatus of the present invention includes a base 1, in the form of a casting, which is enclosed within a housing or cover 2, which cover is only partly shown in Figure 2, being broken away in order that the mechanism of the present apparatus may be more clearly seen.

This base portion 1, as well as the housing 2, may be made of any suitable construction, and it will be understood that the electrical circuit and elements of the magnetic apparatus may be enclosed within the same housing, if desired. Since the electrical circuits form no part of the present invention they are neither illustrated nor described herein, but it will be understood that they are of any desired or conventional construction.

Figure 6:
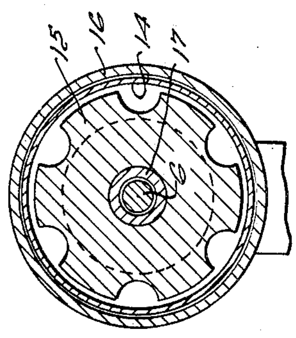
Figure 6 is a sectional view taken on line 6—6 of Figure 2 to illustrate the construction of one of the eddy-current clutches.

A wire spool 3 and a take-up spool 4 may be mounted upon spindles 5 and 6, respectively, in order that the same may be driven. Means are provided for selectively driving either or both of the spindles 5 and 6 and for driving the wire spool and the take-up spool, respectively, from a constant speed electric motor 7 through magnetic clutches of the eddy-current type, which will permit continuous slipping in the drive connection between the spindles and the motor. Thus, as best shown in Figure 2, the spindle 6 is journaled for rotation in bearings 8 and 9 located, respectively, at the rear end of the spindle and at approximately the mid-point of the spindle, and by another bearing 10 (Figure 3) at its forward end. The bearings are mounted in a pillow block 11 which is pivotally secured to the base by a vertical pivot pin 12 positioned near the forward face of the housing 2. The spindle 6 carries a cup-like member 14 which is of nonmagnetic metal but which is a good conductor of electricity and, as shown in Figure 6, surrounds a multiple radial pole permanent magnet rotor 15 and fits within an iron or soft-steel housing 16. The housing 16 and multiple pole magnet 15 are fixed to a sleeve or bushing 17. The bushing 17 is rotatably supported by the spindle 6 to permit rotation of the housing 16 and the magnet 15 about the spindle. Elements 14, 15 and 16 constitute an eddy-current clutch, with the result that on rotation of the housing 16 a rotary torque will be transmitted to the cup 14 and, consequently, to the spindle 6.

The shaft of the motor 7 is provided at the rear with a drive roller 18 having a circumferential rubber rim 19 adapted to frictionally engage and rotate the housing 16 and, as stated in the foregoing, transmit a rotary torque to the cup 14 and thus drive the spindle 6 and the wire spool 3.

In a similar manner, the spindle 5 is supported upon a pivoted pillow block 20 which is identical in construction and mode of operation to the previously described pillow block 10, and this spindle 5 is likewise connected to the drive roller 18 by means of the housing of a magnetic eddy-current clutch 21 identical to the previously described magnetic clutch 14—16.

The rearward ends of the pillow blocks 10 and 20 are held by means of contractible springs 22 and 23, respectively, in such positions as to normally hold the housings of the magnetic clutches 14—16 and 21 in engagement with the member 19 on roller 18 at the same time, with the result that spindles 6 and 5 are subject to a winding torque in a counterclockwise direction when the motor 7 is running and the remaining parts are in the stop position. As will hereinafter become more clear, the wire is so wound on the wire spool 3 and the take-up spool 4 that the winding torque thus applied to spindles 5 and 6 tends to wind the wire on both spools simultaneously and, consequently, substantially balance each other. As a result, when the parts are in the stop position and the motor is started, the slack wire between the spools is taken up with substantially no movement of either spool.

Figure 5:
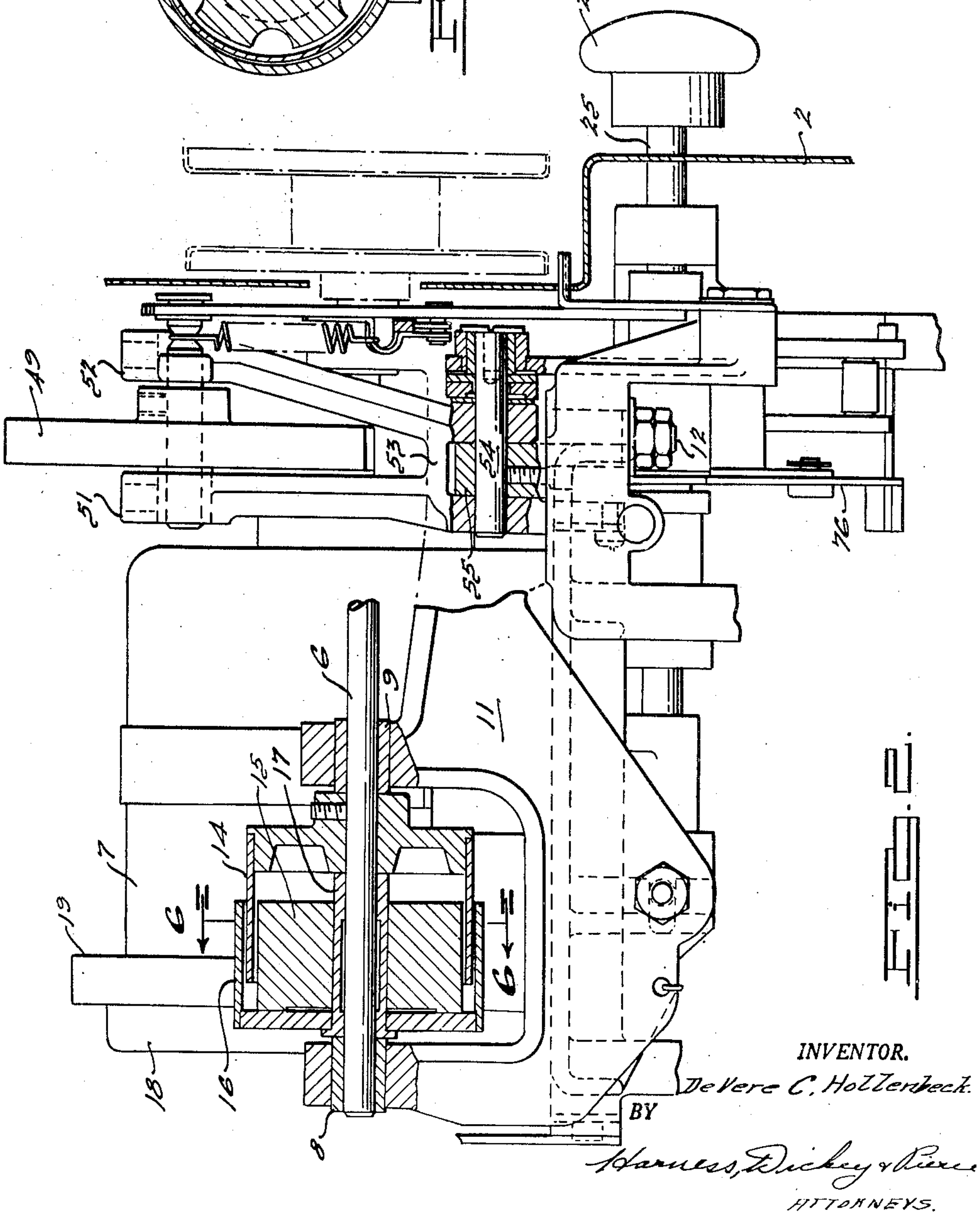
Figure 5 is a sectional elevation taken on the line 5—5 of Figure 1, illustrating a brake for the take-up spool.

As a means for selectively controlling the operation of the apparatus of the present invention, a rotatable control knob 24 is provided. The knob 24 is fixed to a control shaft 25 which is journaled at its forward end within a bearing 26 of a bracket 27 provided by a support mounted on the forward wall of the casing 1, and the opposite end of the control shaft 25 is journaled in a bearing 28 in base 1, all as may be seen in Figure 1. Connected to the control knob 24 is a mating cam, indicated generally at 29 and having cam surfaces 30, 31 and 32. When the control knob 24 is in its stop or off position, the main control cam 29 will be in such a position that the cam surface 30 depresses a button 33 on a switch 34 which controls the supply of current to motor 7. When the button is depressed in this manner, the switch 34 is opened. At the same time, the surface of the cam 31 is freed from a pad 35 on a bell-crank shaped lever 36, shown best in Figure 5, which is pivoted at 37 to the base 1, permitting a brake surface 38 on the lever 36 to be forcibly held by means of a spring 39 against the outer diameter of the cup 14. It will be apparent that upon initially moving the control knob 24 in either direction from the stop position, cam 30 will disengage the button 33 while cam 31 will enter into engagement with pad 35 of lever 36. When this occurs, the switch 34 closes the motor circuit, thereby starting the motor, and the brake lever is swung to release the cup 14.

Figure 1:
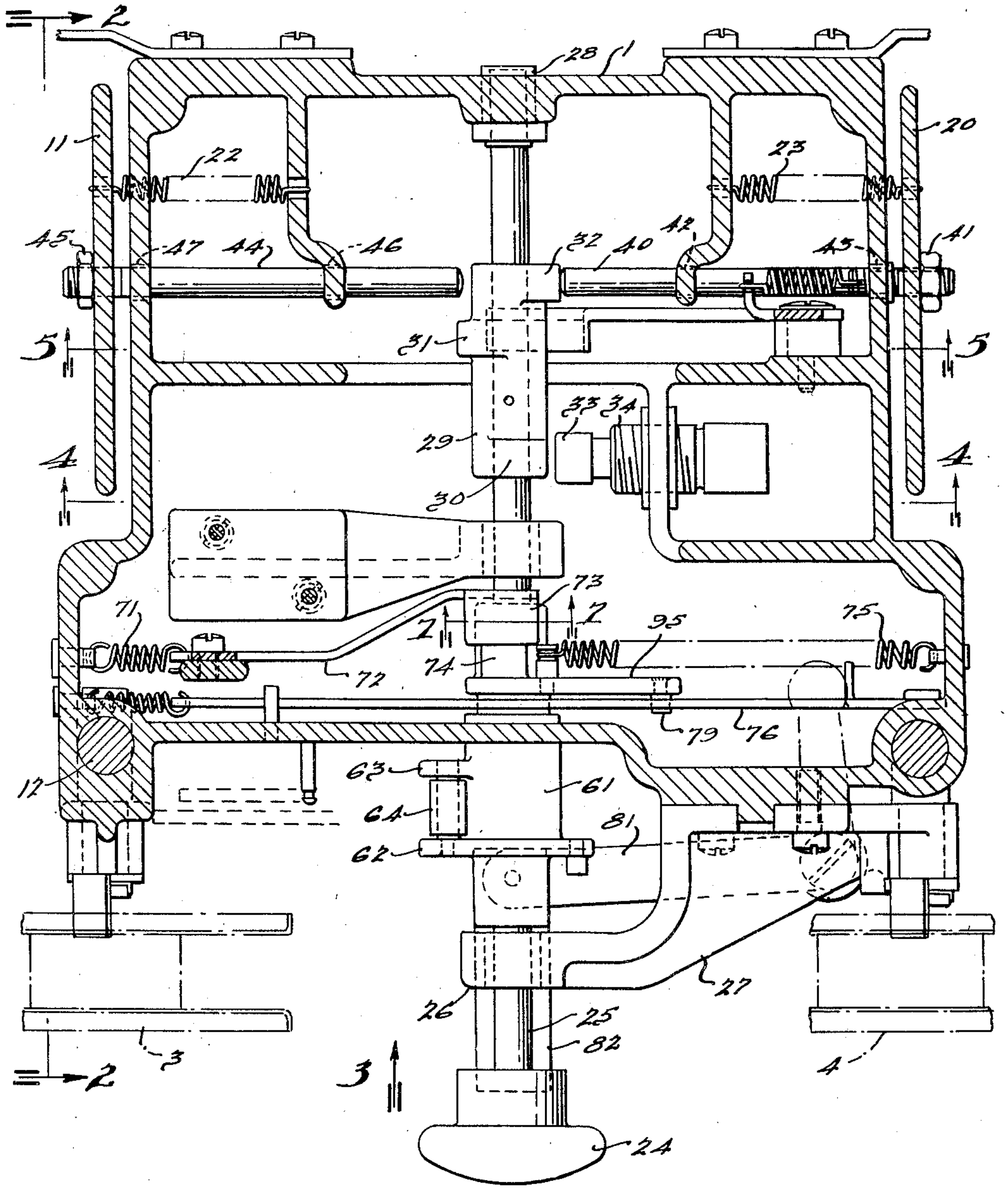
Figure 1 is a plan view of the chassis of a magnetic wire sound recording and reproducing apparatus embodying the improvements of the present invention, with a wire spool and a take-up spool in assembled relation and with the top casing removed for illustrating certain of the apparatus interiorly of said chassis.
Figure 7:
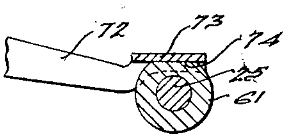
Figure 7 is a section taken on line 7—7 of Figure 1.

As shown in Figure 1, a rod 40 is threaded into the web portion of the pillow block 20 and positioned in such manner that the rounded end thereof may contact cam 32, in which position the rod 40 is locked by means of a lock nut 41 abutting the web of the pillow block. The rod 40 is adapted to be shifted within slotted openings provided at 42 and 43 in the base 1. In like manner, a rod 44 is threaded into the web of the pillow block 10 and locked in position by means of a lock nut 45 in such manner that its rounded end may enter into engagement with the cam 32. The rod 44 is also slidably mounted within slotted openings 46 and 47 provided in base 1.

When the control knob 24 is in the stop or off position, the cam 32 does not contact the rounded end of either rod 40 or rod 44 and the member 19 of the driving wheel 18 on the motor 7 may contact the housing of both magnetic clutches for driving the same and causing the slack in the wire to be taken up, as previously described. However, after initial rotation of the control knob 24 to start the motor 7 and release the brake 36, continued rotation of the control knob 24 in either direction will cause the cam 32 to come into contact with the rounded end of rod 40 or 44, depending upon the direction of rotation of the control knob 24, and thereby effect pivotal shifting of one of the pillow blocks and engagement of one or the other of the housings with the rubber rim 19 on frictional drive roller 18. The cam 32 is so positioned upon the main control cam 29 that when the control knob 24 is rotated in a counterclockwise direction from a stop or off position to a rewind position, the final portion of the movement of the shaft 25 will result in engagement of the cam 32 with the rounded end of the rod 40, serving to move the pillow block 20 pivotally about a vertical pivot pin (not shown) and thereby to disengage the housing 21 from the rim 19 of motor driving wheel 18. Similarly, rotation of the control knob 24 in a clockwise direction toward play or record position effects engagement of the cam 32 with the rounded end of the rod 44, causing the pillow block 10 to shift pivotally out about pivot pin 11 for moving the magnetic clutch 14—16 out of engagement with the driving means in advance of the completion of the movement of the control knob 24 to play or record position.

Figure 3:
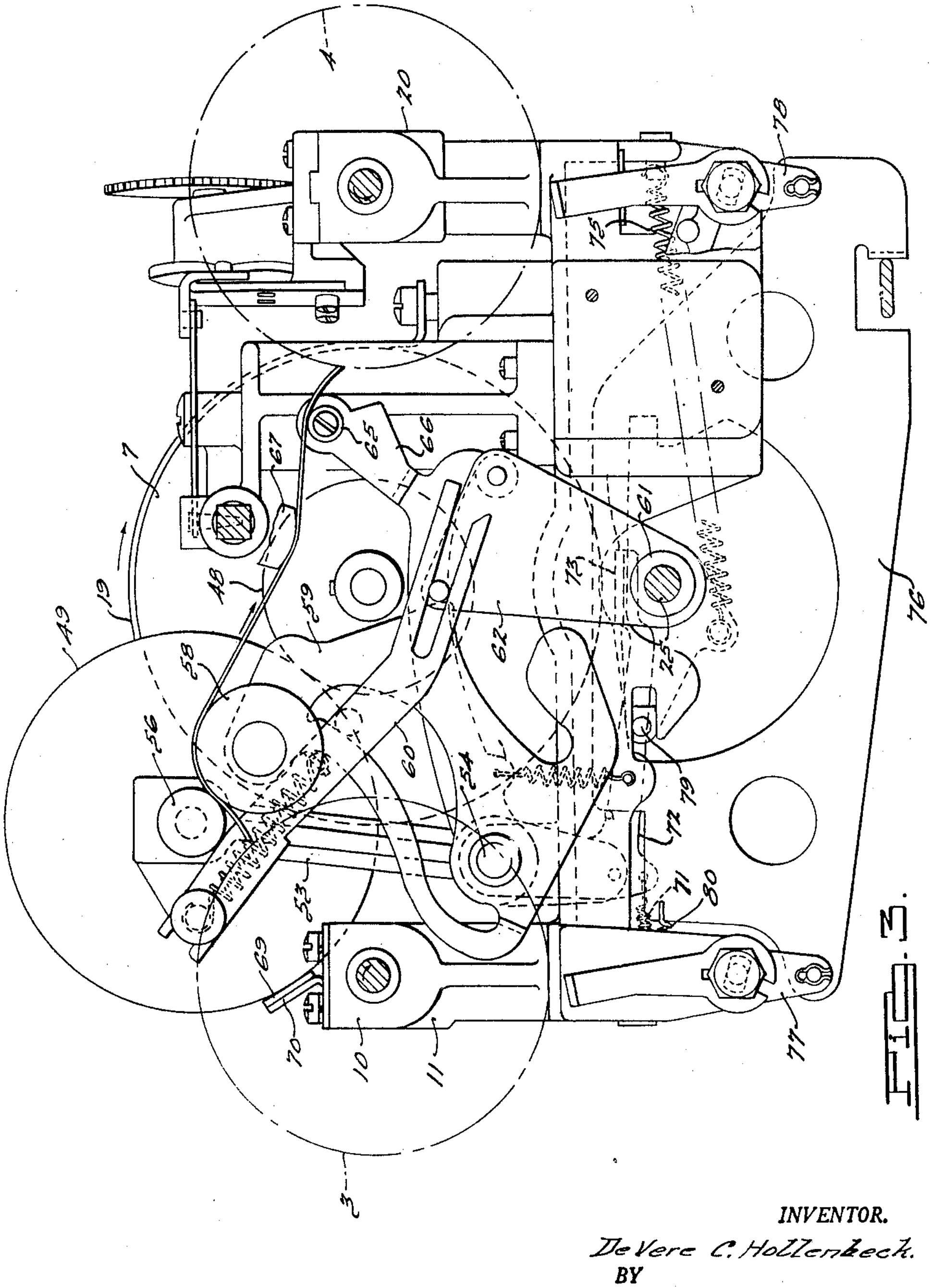
Figure 3 is an elevational view taken in the direction of the arrow 3 of Figure 1, illustrating the mechanism of the machine of the present invention with the parts in play position.
Figure 4:
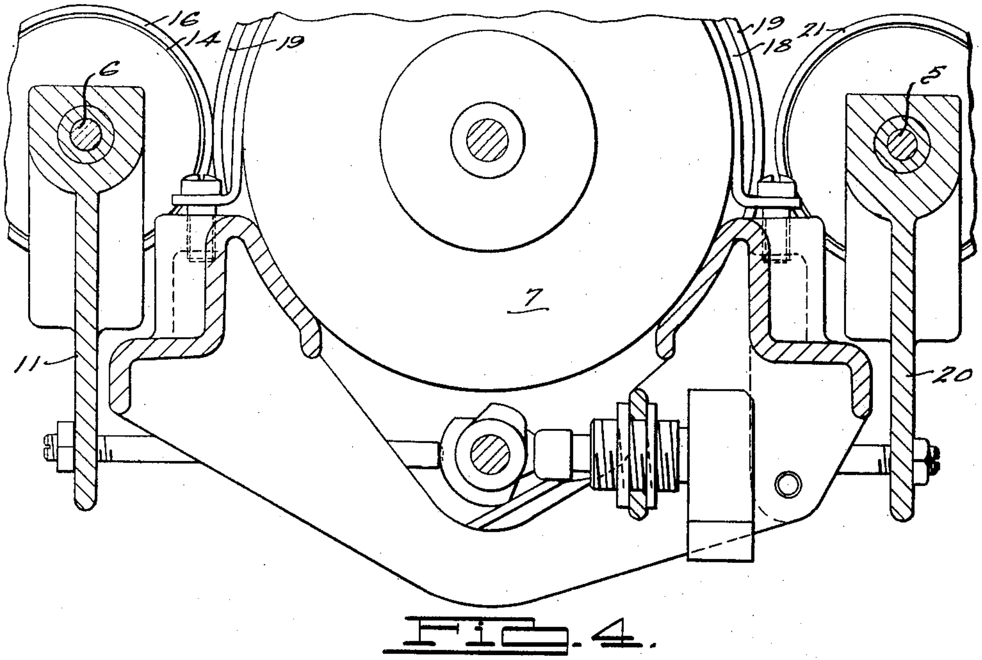
Figure 4 is a sectional elevation taken on line 4—4 of Figure 1, showing the cam-operated switch for the motor.
Figure 5:
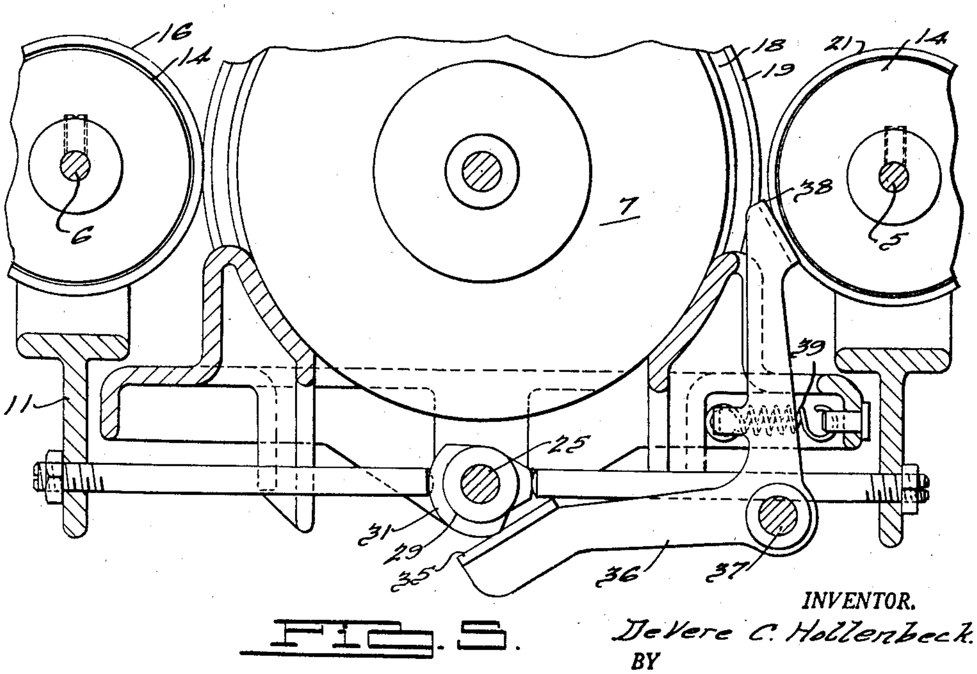

The means for engaging and driving the wire when it is being wound upon the take-up spool 4 is shown in Figure 3. This means includes a roller 48 mounted on the forward end of the motor shaft and adapted to be brought into engagement with a capstan drive roller 49. The roller 49 is rotatably supported by a shaft 50 journaled for rotation in bearings 51 and 52 of a yoke 53 which is pivotally mounted by means of a pin 54 on an upwardly projecting lug 55 provided on the base 1. The shaft 50 projects forwardly through the bearing 52 provided on the yoke 53, as best shown in Figure 2, and carries a non-ferrous metallic capstan wire drive roller 56.

A driving engagement between wire 57 and the capstan wire drive roller 56 is established when the knob is in play position (Figure 3) by a rubber pinch roller 58 carried by a pinch roller arm 59, also pivotally supported by the pin 54. The wire 57 is pinched between rollers 56 and 58 with considerable pressure to establish a driving connection between the wire 57 and the capstan wire drive roller 56. When the control knob 24 is in off position or in the rewind position, the wire 57 and roller 58 are out of engagement with the capstan roller 56.

The mechanism for moving the pinch roller 58 upwardly into contact with the capstan roller 56 and applying a pressure to the wire forms no part of the present invention, in itself, and, consequently, need not be described in detail. For a more full description, reference may be had to the co-pending application of Irving A. Stone on "Magnetic Wire Sound Recording and Reproducing Apparatus," Serial No. 681,213, filed concurrently herewith, now Patent No. 2,467,509 dated April 19, 1949. It is sufficient to note here that that mechanism includes the pinch roller arm 59, which is pivoted on pin 54, the pressure controlling lever 60 and associated elements, and the sleeve 61, which is fixed on shaft 25 and carries a pair of arms 62 and 63 that support a roller 64.

The arrangement is such that rotation of the control knob 24 in a clockwise direction, toward play position, first effects starting of the motor 7 to start rotation of spindles 5 and 6. In order that the motor 7 may come up to speed as rapidly as possible, continued rotation of the control knob 24 in this direction next effects disengagement of the magnetic clutch 14—16 by shifting the pillow block 10 outwardly to relieve the motor 7 of the torque load imposed by the clutch 14—16. When the clutch 14—16 is disengaged in this manner from the drive roller 18, its housing 16 engages an adjacent stationary brake (not shown), the purpose of which is to somewhat retard the rotation of the wire spool 3 and thereby tension the wire 51 as the same is unwound from that spool. Next, on continued movement of the control knob 24, the pinch roller 58 is swung into engagement with the capstan roller 56. Thereafter, means operated by further movement of the control knob 24 applies a pinching pressure to the pinch roller 58. Final movement of the knob into play-back or record position elevates a roller 65 which is carried by an arm 66 and thereby completes upward movement of the wire into the play-back or recording head 67. The head is mounted on a reciprocating bar 68 which is reciprocated in the usual fashion by a level wind mechanism, with the result that the head also operates to level wind the wire on the take-up spool. The head 67, which is only indicated fragmentarily, may be of any desired or conventional construction and will be connected in the usual manner to the electrical circuit of the apparatus.

It will be observed that if the capstan drive roller 49 were journaled in fixed permanent driving relation to the motor roller 48, as proposed prior to the present invention, the wire would begin to feed as soon as the pinch roller moved the wire into engagement with the capstan roller 56; and that if the speed of the motor were then insufficient to transmit appreciable torque through clutch 14, a loop would form in the wire between the capstan roller and the take-up spool. This difficulty is avoided, in accordance with the invention of the present application, by journaling the roller 49 on a yoke 53 and pivotally mounting the yoke 53 on the same pin 54 which supports the pinch roller arm 59. As the result of this arrangement, the yoke, pinch roller arm and pressure controlling lever 60 may pivot as an assembly about pin 54 without altering the relative positions of capstan 56 and pinch roller 58 or the pressure exerted between them. Such pivotal movement is limited to a very small amount, just sufficient to disengage the drive roller 49 from the motor roller 48, by engagement of the roller 49 with a stationary brake pad 69 on a bracket 70 fixed to the chassis. Consequently, when the knob 24 is rotated in a clockwise direction to raise the pinch roller and the pressure lever 60, the yoke 53 will not swing in a counterclockwise direction more than an amount sufficient to disengage rollers 48 and 49.

The lower end of the yoke 53 projects below the pin 54 and is connected by a spring 71 to the chassis. This spring, which is very light, tends to swing the yoke 53 in a clockwise direction and effect engagement of rollers 48 and 49, but, as hereinafter explained, is not sufficiently strong to establish a driving pressure between the rollers 48 and 49.

Means are provided to prevent engagement of rollers 48 and 49 except when the knob 24 is in play-back or record position. This includes an arm 72 fixed to the yoke 53 and having a flat end portion or pad 73 which rests on the rear end of sleeve 61, thus normally preventing sufficient clockwise swinging movement of the yoke to engage rollers 48 and 49. Sleeve 61 is provided at one side with a flat or cut-away portion 74 which, when the knob 24 is in play-back or record position, permits clockwise swinging movement of yoke 53 and driving engagement of rollers 48 and 49. Accordingly, the wire cannot be fed by the capstan roller until the control knob is in play-back or record position. Even then it will not feed the wire until the motor has reached a speed which will transmit sufficient torque to the take-up spool to prevent the formation of loops because the spring is not sufficiently strong to establish a driving pressure engagement between the rollers. Only when an appreciable tension is applied to the wire by the take-up spool will the necessary driving relation be established, and then it is established by the tension on the wire, itself. In that connection, it will be noted that since the wire is pinched between rollers 56 and 58, the tension on the wire tends to rotate the assembly, consisting of yoke 53, pinch roller arm 59 and pressure lever 60, in a clockwise direction and thus force roller 49 against the motor roller 48.

It will be appreciated that if the tension applied to the wire by the take-up roller is sufficiently high, there would be no necessity for the spring 71 and the omission of spring 71 under those circumstances is within the contemplation of the present invention. However, it is preferred to employ the spring to assist the wire tension, since in that way a lower wire tension may be employed and less energy is required to maintain the tension. In actual practice, satisfactory results have been obtained with a wire tension of three ounces and an equivalent spring tension of one ounce.

As a further modification of the invention, the spring 71 may be made sufficiently strong to supply all of the driving pressure required between rollers 48 and 49. In that case, the pressure engagement is solely under the control of knob 24 and will be established when the knob is in play-back or record position. This arrangement will produce fairly satisfactory results because the apparatus may be so designed that the motor will come up to the desired speed within the usual time required to move the control knob into play-back or record position. However, since this time varies, the preferred construction effects driving of the wire in response to wire tension, as previously described.

When the control knob reaches the limit of its rotation in either direction, it is latched in position by a latch mechanism. Thus, the latch is effective to hold the knob either in the play-back or record position or in the rewind position. Means are also provided for releasing the latch either manually at any time or automatically when either of the spools is unwound to almost the end of the wire. Upon such release, the knob is returned to stop position by a spring 75 which is connected between the chassis and an arm on sleeve 61. This latch mechanism and associated means form no part of the present invention but are disclosed and claimed in the aforementioned application of Irving A. Stone, to which reference may be had for further details of the construction and mode of operation. It is sufficient to note here that the latch includes a latch plate 76 which is supported for lateral movement by a pair of pivoted levers 77 and 78 and which co-operates with a pin 79 fixed to an arm of sleeve 61. A spring 80 normally urges the plate 76 toward latching position, and a bell-crank lever 81 which is operated by a push button 82 will, on depression of the button, move the latch plate in its releasing direction.

When the latch is released at the end of play-back or recording, the pinch roller arm 59 with the pinch roller 58 and the arm 66 with the roller 65 are lowered, releasing and lowering the wire 57 out of the head 67, the clutches 14—16 and 21 are again engaged by the drive roller 18, the motor switch 34 is open, and all operation of the mechanism ceases. Any tendency of the capstan drive roller and capstan roller 56 to overrun and throw a loop at this time is prevented by reason of the fact that as the knob 24 begins its return to stop position, sleeve 61 lifts arm 72 and thereby swings yoke 53 counterclockwise into a position in which roller 49 engages brake pad 69.

Thereafter, if it is desired to rewind the wire, the control knob 24 may be rotated in a counter-clockwise direction. This starts the motor 7 again and releases the brake 36, allowing the magnetic clutches 14—16 and 21 to initially tension the wire 57 between the spools 3 and 4, as described in the foregoing. Final rotation of the control knob 24 permits cam 32 to contact the rod 40 for shifting the pillow block 20 to disengage the clutch 21 from the motor roller 18, and brings the housing of the clutch 21 into contact with an adjacent brake (not shown) which imposes a slight retarding force on the take-up spool 4 during the rewind operation. This brake, as disclosed more fully in said application of Irving A. Stone, is stationary and has a felt pad which contacts the housing of the clutch 21 and is designed to resist rotation of the take-up spool 4 only sufficiently to prevent overrunning and throwing of a loop during rewind, for in this operation the clutch 14—16 is substantially unopposed and, consequently, a rapid rewind results.

After the rewinding operation is completed, the control knob 24 is returned to its off position by releasing the latch plate and all operation ceases.

As the control knob 24 returns to off position at the termination of the rewind operation, the clutch 21 reengages the motor roller 18 and this imposes an increased counter-rotative force tending to stop rotation of the take-up spool 4, but such retarding force is effective at the driving side of the clutch. Due to the slippage between the clutch elements, there is a tendency for the take-up spool to continue rotating and thereby throw a loop. For this reason, additional braking is required. To overcome this tendency, an additional braking means is provided on the spood side of the clutch 21, namely the previously described brake 36. Brake 36 engages the cup 21 at the termination of the rewind operation and thus prevents the throwing of a loop in the wire 57 when the control knob is returned to off position.

The mechanism for raising the pinch roller 58, the mechanism for pinching the wire between the pinch roller 58 and the capstan wire drive roller 56, the mechanism for raising the wire to the head 65, and the latching means for locking the control knob 24 in either play or rewind position form no part of the present invention, but are claimed in the aforementioned patent of Irving A. Stone.

What is claimed is:

1. In a wire reeling mechanism, a pair of spindles adapted to receive a wire spool and a take-up spool, respectively, a constant speed motor, means including a slipping torque transmitting device connecting the motor and the take-up spool spindle and adapted to transmit a wire tensioning torque to the take-up spindle, means adapted to engage the wire at a point between the spools and feed the wire at constant speed toward the take-up spool, a separable driving connection between said wire feeding means and said motor, a starting switch for the motor, and means including a single manually operable control element effective on operation to successively close said starting switch and thereafter render operable said driving connection between the motor and said wire feeding means.

2. In a wire reeling mechanism, a pair of spindles adapted to receive a wire spool and a take-up spool, respectively, a constant speed motor, means including a slipping torque transmitting device connecting the motor and the take-up spool spindle and adapted to transmit a wire tensioning torque to the take-up spindle which is a function of the difference in speed between the motor and the take-up spindle, means adapted to engage the wire at a point between the spools and feed the wire at constant speed toward the take-up spool, a separable driving connection between said wire feeding means and said motor, a starting switch for the motor, and means including a single manually operable control element effective on operation to successively close said starting switch and thereafter render operable said driving connection between the motor and said wire feeding means.

3. In a wire reeling mechanism, a pair of spindles adapted to receive a wire spool and a take-up spool, respectively, a constant speed motor, means including a slipping troque transmitting device connecting the motor and the take-up spool spindle and adapted to transmit a wire tensioning torque to the take-up spindle, means adapted to engage the wire at a point between the spools and feed the wire at constant speed toward the take-up spool, a separable driving connection between said wire feeding means and said motor, a starting switch for the motor, and means including a single manually operable control element effective on movement in one direction to successively close said starting switch, establish a driving engagement between said feeding means and said wire and thereafter render operable said driving connection between the motor and said wire feeding means.

4. In a wire reeling mechanism, a pair of spindles adapted to receive a wire spool and a take-up spool, respectively, a constant speed motor, means including a slipping torque transmitting device connecting the motor and the take-up spool spindle and adapted to transmit a wire tensioning torque to the take-up spindle which is a function of the difference in speed between the motor and the take-up spindle, means adapted to engage the wire at a point between the spools and feed the wire at constant speed toward the take-up spool, a separable driving connection between said wire feeding means and said motor, a starting switch for the motor, and means operable in response to the application of tension to said take-up spindle for rendering said separable drive connection operative.

5. In a wire reeling mechanism for a magnetic wire sound recording and reproducing mechanism, a pair of spindles adapted to receive wire spools, a motor having a drive roller, means for driving either spindle for winding wire on one spool and unwinding wire from the other spool, means for feeding the wire in one direction including a pivotally supported capstan drive roller and a capstan wire drive roller connected thereto, said capstan drive roller being adapted to swing into driving relation to said motor roller, and wire pinching means pivotally supported at the same point as the capstan drive roller and the capstan roller and adapted to press the wire against the capstan roller at a point between the spools, said rollers being adapted to swing as a unit about their common pivotal axis and be pulled as a unit by the tension of the wire in a direction to bring the capstan drive roller into operative engagement with the motor for feeding the wire.

6. In a wire reeling mechanism for a magnetic wire sound recording and reproducing mechanism, a pair of spindles adapted to receive wire spools, a motor, separate means for connecting each spindle to the motor for driving the spindles to wind the wire on either spool, a yielding clutch mechanism in the connection between the motor and one spool, control means selectively operable from an off position to an operating position for rendering effective one of said separate means for driving a spindle, means to retard the rotation of the drive connection to said one spool at a point on the motor side of the clutch mechanism during unwinding rotation of said spool, and means for applying a retarding force to the drive connection at the spool side of such yielding mechanism when said control means is moved toward said off position.

7. In a wire reeling mechanism for a magnetic wire sound recording and reproducing mechanism, a pair of spindles adapted to receive a wire spool and a take-up spool, respectively, a motor, separate means for connecting each spindle to the motor for driving the spindles to wind the wire on either spool, a yielding clutch mechanism in the connection between the motor and take-up spool, control means selectively operable from an off position to either of two operating positions for rendering effective either of the separate means for driving either spindle, means to retard the rotation of the drive connection to the unwinding spool at a point on the motor side of the clutch mechanism during rewind, and means for applying a retarding force to the drive connection at the spool side of such yielding clutch mechanism when said control means is moved to said off position.

8. In a wire reeling mechanism, a pair of spindles adapted to receive a wire spool and a take-up spool, respectively, a motor, a movably mounted wire drive shaft, means on said shaft adapted in one position of the shaft to establish a driving connection between the wire drive shaft and the motor, a wire engaging roller on said wire drive shaft adapted to engage the wire at a point between the spools and feed the wire toward the take-up spool, a control element for starting and stopping said motor, means associated with said element for moving said wire drive shaft in a direction to disengage the driving connection between said shaft and the motor when the control element is operated to stop the motor, and means operable to resist rotation of said shaft when it is moved in said direction.

9. In a wire reeling mechanism, a pair of spindles adapted to receive a wire spool and a take-up spool, respectively, a motor, a movably mounted wire drive shaft, means on said shaft adapted in one position of the shaft to establish a driving connection between the wire drive shaft and the motor, a wire engaging roller on said wire drive shaft adapted to engage the wire at a point between the spools and feed the wire toward the take-up spool, a control element for starting and stopping said motor, means associated with said element for moving said wire drive shaft in a direction to disengage the driving connection between said shaft and the motor when the control element is operated to stop the motor, means operable to resist rotation of said shaft when it is moved in said direction, and means for moving said wire drive shaft into the position in which a driving connection to the motor is established when the control element is operated to start the motor.

10. In a wire reeling mechanism, a pair of spindles adapted to receive a wire spool and a take-up spool, respectively, a motor, a movably mounted wire drive shaft, means on said shaft adapted in one position of the shaft to establish a driving connection between the wire drive shaft and the motor, a wire engaging roller on said wire drive shaft adapted to engage the wire at a point between the spools and feed the wire toward the take-up spool, a control element for starting and stopping said motor, means associated with said element for moving said wire drive shaft in a direction to disengage the driving connection between said shaft and the motor when the control element is operated to stop the motor, means operable to resist rotation of said shaft when it is moved in said direction, and means for moving said wire drive shaft into the position in which a driving connection to the motor is established when the control element is operated to start the motor, said means being operable in response to a tension applied to the wire by the take-up spool.

DE VERE C. HOLLENBECK.

REFERENCES CITED

The following references are of record in the file of this patent:

UNITED STATES PATENTS

| Number | Name | Date |
|---|---|---|
| 1,881,056 | McBain | Oct. 4, 1932 |
| 2,071,192 | Younts | Feb. 16, 1937 |
| 2,343,850 | Fairbanks et al. | Mar. 7, 1944 |
| 2,364,148 | Kellogg | Dec. 5, 1944 |
| 2,365,691 | Fodor | Dec. 26, 1944 |

FOREIGN PATENTS

| Number | Country | Date |
|---|---|---|
| 336,249 | Italy | Feb. 14, 1936 |